United States Patent
Yoo (10) Patent No.: US 12,236,476 B1
(45) Date of Patent: Feb. 25, 2025

(54) CONTROL METHOD AND SYSTEM FOR ELECTRONIC DEVICE PROVIDING OFFLINE MARKET-BASED VIRTUAL SPACE SHOPPING SERVICE

(71) Applicant: Persona AI Co., Ltd., Seoul (KR)

(72) Inventor: Seungjae Yoo, Seoul (KR)

(73) Assignee: Persona AI Co., Ltd., Seoul (KR)

( * ) Notice: Subject to any disclaimer, the term of this patent is extended or adjusted under 35 U.S.C. 154(b) by 0 days.

(21) Appl. No.: 18/619,064

(22) Filed: Mar. 27, 2024

(30) Foreign Application Priority Data

Jan. 27, 2023 (KR) .................. 10-2023-0011006

(51) Int. Cl.
| | | |
|---|---|---|
| G06Q 30/0601 | (2023.01) | |
| G06Q 20/06 | (2012.01) | |
| G06Q 20/12 | (2012.01) | |
| G06Q 30/015 | (2023.01) | |
| G06Q 30/0207 | (2023.01) | |
| G06Q 30/0226 | (2023.01) | |

(Continued)

(52) U.S. Cl.
CPC ....... *G06Q 30/0643* (2013.01); *G06Q 20/065* (2013.01); *G06Q 20/123* (2013.01); *G06Q 30/015* (2023.01); *G06Q 30/0207* (2013.01); *G06Q 30/0226* (2013.01); *G06Q 30/0239* (2013.01); *G06Q 30/0277* (2013.01); *G06T 13/205* (2013.01); *G06T 13/40* (2013.01); *G06T 17/00* (2013.01)

(58) Field of Classification Search
CPC ............. G06Q 30/0643; G06Q 20/065; G06Q 20/123; G06Q 30/015; G06Q 30/0207; G06Q 30/0226; G06Q 30/0239; G06Q 30/0277; G06T 13/205; G06T 13/40; G06T 17/00
See application file for complete search history.

(56) References Cited

U.S. PATENT DOCUMENTS

2021/0124924 A1* 4/2021 Magee ................. G06V 10/82
2022/0383397 A1* 12/2022 Haapoja ............. G06Q 30/0643

FOREIGN PATENT DOCUMENTS

| JP | 2022-117770 A | 8/2022 |
|---|---|---|
| KR | 10-2122564 B1 | 6/2020 |

(Continued)

OTHER PUBLICATIONS

Artificial intelligence for the metaverse: A survey Thien Huynh-The, Quoc-Viet Pham, Xuan-Qui Pham, Thanh Thi Nguyen, Zhu Han, Dong-Seong Kim (Year: 2022).*

(Continued)

*Primary Examiner* — Alexandru Cirnu
(74) *Attorney, Agent, or Firm* — NSIP Law (57) ABSTRACT

The present disclosure relates to a control method and a system for an electronic device providing an offline market-based virtual space shopping service, and particularly, the control method for an electronic device includes: setting, by the electronic device, a virtual location of a user according to a user input within a virtual space representing an offline marketplace; providing, by the electronic device, at least one virtual image matched with the virtual location of the user based on image data constituting the virtual space; and providing, by the electronic device, an image of at least one metahuman positioned within a predetermined distance from the virtual location of the user within the virtual space.

9 Claims, 5 Drawing Sheets

(51) Int. Cl.
*G06Q 30/0241* (2023.01)
*G06T 13/20* (2011.01)
*G06T 13/40* (2011.01)
*G06T 17/00* (2006.01)

(56) References Cited

FOREIGN PATENT DOCUMENTS

| | | |
|---|---|---|
| KR | 10-2409762 B1 | 6/2022 |
| KR | 10-2585762 B1 | 10/2023 |

OTHER PUBLICATIONS

Saltlux, The protagonist of the metaverse era, 'digital humans', values and utility, Naver Blog(online), URL:https://blog.naver.com/saltluxmarketing/222269505818, Mar. 9, 2021.

Korean Notice of Allowance issued on Aug. 11, 2023 in corresponding Korean Application No. 10-2023-0011006 (2 pages in Korean and 1 page in English).

Korean Office Action issued on Apr. 19, 2023 in corresponding Korean Application No. 10-2023-0011006 (5 pages in Korean and 3 pages in English).

* cited by examiner

CONTROL METHOD AND SYSTEM FOR ELECTRONIC DEVICE PROVIDING OFFLINE MARKET-BASED VIRTUAL SPACE SHOPPING SERVICE

CROSS REFERENCE TO RELATED APPLICATIONS

This application claims the benefit under 35 USC § 119(a) of Korean Patent Application No. 10-2023-0011006, filed on Jan. 27, 2023, the entire disclosure of which is incorporated herein by reference for all purpose.

FIELD

The present disclosure relates to a control method and a system for an electronic device providing an offline market-based virtual space shopping service, and particularly, to a technology that implements a metaverse space of an offline marketplace such as a traditional marketplace, and supports market guidance and shopping in a metaverse to improve marketplace utilization and accessibility.

DESCRIPTION OF RELATED ART

As part of efforts to revitalize traditional marketplaces, benefits such as income tax deductions for payments made in traditional marketplaces, provision of gift certificates that can be used in traditional marketplaces, and hosting of events in traditional marketplaces are provided, but are still ignored by the Millennials and Generation Z.

Specifically, according to the 2021 market survey by the Federation of Korean Industries, in the case of the generation in their 20's and 30's, which corresponds to the Millennials and Generation Z, 55.3% purchase goods through mobile or online, and usage ratios of hypermarkets, convenience stores, and supermarkets are 19.3%, 15.3%, and 7.3%, respectively, while the purchase rate through traditional marketplaces is only 1.2%.

Meanwhile, according to an announcement by the Small Business Market Promotion Agency, annual sales in traditional marketplaces over 10 years until 2020 will remain in the 20 trillion won range, while online transactions are increasing by tens of trillions every year.

Therefore, there is a need to suggest a method of bringing traditional marketplaces online and improving accessibility accordingly.

Meanwhile, the above information disclosed in this Background section is only for enhancement of understanding of the background of the invention and therefore it may contain information that does not form the prior art that is already known in this country to a person of ordinary skill in the art.

PRIOR ART

Patent Literature (Patent Literature 1) Korean Patent Registration No. 10-2471738, 2022.11.23.

SUMMARY

Problems to be Solved

The present disclosure provides a control method and a system for an electronic device providing an offline market-based virtual space shopping service, which help guide the market within the metaverse through metahumans trained to enable two-way conversation and to express emotions appropriate to the situation, and to increase participation rates by paying metacoin according to service use.

The objects to be achieved by the present disclosure are not limited to the aforementioned objects, and other objects, which are not mentioned above, will be apparent to a person having ordinary skill in the art from the following description.

Means to Solve the Problems

In an aspect, provided is a control method for an electronic device, which includes: setting, by the electronic device, a virtual location of a user according to a user input within a virtual space representing an offline marketplace; providing, by the electronic device, at least one virtual image matched with the virtual location of the user based on image data constituting the virtual space; and providing, by the electronic device, an image of at least one metahuman positioned within a predetermined distance from the virtual location of the user within the virtual space, in which the metahuman provides at least one customer assistance service among questioning and answering, product guidance, store guidance, product purchase support, discount guidance, and payment history guidance according to the user input.

Additionally, the metahuman includes a first artificial intelligence model for performing voice recognition, a second artificial intelligence model for performing questioning and answering, and a third artificial intelligence model for generating facial expressions and mouth shapes that match the content of the speech, the first artificial intelligence model is a model trained to extract a question text, which is a text included in the user's voice data, the second artificial intelligence model is a model trained to grasp the context of the question included in the question text and generate an answer text which is an answer to the question, and the third artificial intelligence model is a model trained to identify the emotion matching a word based on an attribute of word included in the answer text, and select a mouth shape image matching the answer text and a facial expression image matching the identified emotion.

Additionally, the control method for an electronic device may further include generating, by the electronic device, an image of a metahuman for each of the plurality of sellers based on location information in the virtual space, a seller image, seller voice, and seller information for each of the plurality of sellers in the offline marketplace, and the providing of the image of the metahuman may further include providing an image of a metahuman according to the selected seller when a user input of selecting at least one of the plurality of sellers is acquired.

Additionally, the control method for an electronic device may further include: acquiring, by the electronic device, consumer information including personal information, a purchase history, payment means information, and shopping information of the user based on the input of the user; and identifying, by the electronic device, the age of the user based on the consumer information, and the providing of the virtual image may further include setting a user interface (UI) configuration within the provided virtual image based on the age of the user.

Additionally, the setting of the virtual location of the user may further include calculating the location change amount of the user in the virtual space, and paying, to the user, metacoin which is virtual currency consumable by a payment means in the offline marketplace, which is calculated by applying a first value to the location change amount.

Additionally, the control method for an electronic device further includes: acquiring, by the electronic device, location information of the user; calculating, by the electronic device, a movement distance of the user within the offline marketplace based on the location information; and paying, by the electronic device, metacoin calculated by applying a second value to the movement distance to the user, and the second value is a value larger than the first value.

Additionally, the control method for an electronic device may further include: providing, by the electronic device, pre-registered game contents; and providing, by the electronic device, metacoin based on a performance history for the game contents.

Additionally, the providing of the virtual image may further include providing, when at least one advertisement information is included in the provided virtual image, a first image of each of the advertisement information, and enlarging and providing, when an input of the user of selecting at least one of the first images is identified, the selected image at a predetermined ratio.

Additionally, the enlarging and providing the selected image at the predetermined ratio may further include identifying, when the selected image is an image for recipe information, if bundle discount information matched with the recipe information is registered, a seller for each of a plurality of products included in the bundle discount information based on the virtual location of the user, and providing location information of each identified seller in the virtual space and the bundle discount information.

Meanwhile, in another aspect, provided is a system including: a server providing a virtual space representing an offline marketplace; and a user terminal communicating with the server, and outputting a virtual image within the virtual space, in which the server sets a virtual location of the user within the virtual space based on an input of a user acquired through the user terminal, provides at least one virtual image matched with the virtual location of the user based on image data constituting the virtual space, and provides an image of at least one metahuman positioned within a predetermined distance from the virtual location of the user within the virtual space to the user terminal, the metahuman provides at least one customer assistance service among questioning and answering, product guidance, store guidance, product purchase support, discount guidance, and payment history guidance according to the user input, and includes a first artificial intelligence model for performing voice recognition, a second artificial intelligence model for performing questioning and answering, and a third artificial intelligence model for generating facial expressions and mouth shapes that match the content of a speech, and the first artificial intelligence model is a model trained to extract a question text, which is a text included in the user's voice data, the second artificial intelligence model is a model trained to grasp the context of the question included in the question text and generate an answer text which is an answer to the question, and the third artificial intelligence model includes a model trained to identify the emotion matching a word based on an attribute of word included in the answer text, and select a mouth shape image matching the answer text and a facial expression image matching the identified emotion.

Other details of the present disclosure are included in the detailed description and the drawings.

Advantageous Effects

By a control method and a system for an electronic device providing an offline market-based virtual space shopping service according to the present disclosure, activation of an offline marketplace, in particular, a traditional marketplace, can be planned through transaction support for each seller and consumer, such as an upload of same-day sales products and prices of sellers to the Metaverse space, and consumer shopping in the Metaverse space, and seller directions for each product.

The effects of the present disclosure are not limited to the aforementioned effect, and other effects, which are not mentioned above, will be apparent to a person having ordinary skill in the art from the following disclosure.

DETAILED DESCRIPTION

Advantages and features of the present disclosure, and methods for accomplishing the same will be more clearly understood from embodiments described in detail below with reference to the accompanying drawings. However, the present disclosure is not limited to the embodiments set forth below, and may be embodied in various different forms. The present embodiments are just for rendering the disclosure of the present disclosure complete and are set forth to provide a complete understanding of the scope of the invention to a person with ordinary skill in the technical field to which the present disclosure pertains, and the present disclosure will only be defined by the scope of the claims.

It is also to be understood that the terminology used herein is for the purpose of describing embodiments only and is not intended to limit the present disclosure. In this specification, the singular form also includes the plural form, unless the context indicates otherwise. It is to be understood that the terms "comprise" and/or "comprising" used in the specification does not exclude the presence or addition of one or more other components other than stated components. Like reference numerals refer to like components throughout the specification and "and/or" includes respective mentioned components and all one or more combinations of the components. Although the terms "first", "second", and the like are used for describing various components, these components are not confined by these terms. These terms are merely used for distinguishing one component from another component. Therefore, a first component to be mentioned below may be a second component in a technical concept of the present disclosure.

Unless otherwise defined, all terms (including technical and scientific terms) used in the present specification may be used as the meaning which may be commonly understood by the person with ordinary skill in the art, to which the present disclosure pertains. Further, terms defined in commonly used dictionaries should not be interpreted in an idealized or excessive sense unless expressly and specifically defined.

Further, the term "unit" or "module" used in the specification means software and hardware components such as FPGA or ASIC and the "unit" or "module" performs predetermined roles. However, the "unit" or "module" is not a meaning limited to software or hardware. The "unit" or "module" may be configured to reside on an addressable storage medium and may be configured to play back one or more processors. Accordingly, as one example, the "unit" or "module" includes components such as software components, object oriented software components, class components, and task components, processes, functions, attributes, procedures, subroutines, segments of a program code, drivers, firmware, microcode, circuitry, data, databases, data structures, tables, arrays, and variables. Functions provided in the components and the "units" or "modules" may be combined into a smaller number of components and "units" or "modules" or further separated into additional components and "units" or "modules".

"Below", "beneath", "lower", "above", "upper", etc., which are spatially relative terms, may be used for easily describing a correlation between one component or other components as illustrated in the drawings. The spatially relative terms should be appreciated as terms including different directions of components upon using or operating in addition to directions illustrated in the drawings. For example, when the components illustrated in the drawings are overturned, the components described as "below" or "beneath" the other components may be placed "above" the other components. Thus, the term "below", for example, may include both the below placement and the above placement. The components may be oriented even in different directions, and thus, the spatially relative terms may be interpreted according to the orientation.

In this specification, a computer refers to all types of hardware devices including at least one processor, and depending on the embodiment, the computer may be understood as encompassing software configurations that operate on the hardware device. For example, the computer may be understood to include, but is not limited to, a smartphone, tablet PC, desktop, laptop, and user clients and applications running on each device.

Hereinafter, embodiments of the present disclosure will be described in detail with reference to the accompanying drawings.

Figure 1:
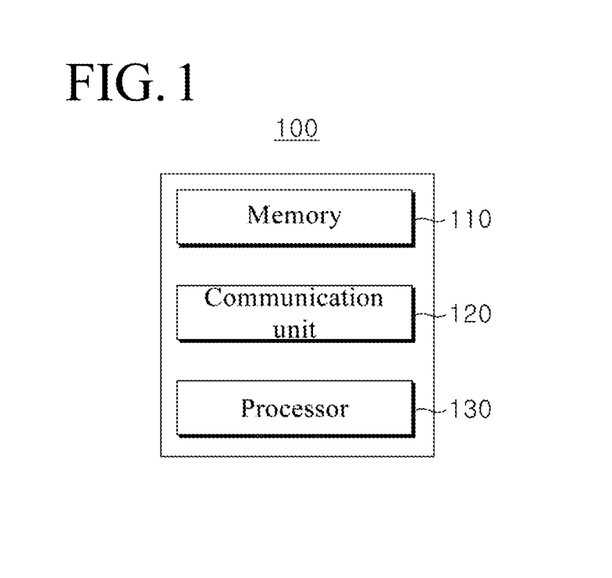
FIG. 1 is a configuration diagram of an electronic device according to an embodiment of the present disclosure.

FIG. 1 is a configuration diagram of an electronic device 100 according to an embodiment of the present disclosure.

As illustrated in FIG. 1, the electronic device 100 includes a memory 110 including a virtual space (e.g., metaverse, etc.) representing an offline marketplace and one or more metahumans 10, 11, and 12 providing at least one customer assistance service of questioning and answering, product guidance, store guidance, product purchase support, discount guidance, and payment history guidance, according to user input, a communication unit 120, and a processor 130.

In this case, the metahumans 10, 11, and 12 may include a first artificial intelligence model for performing voice recognition, a second artificial intelligence model for performing questioning and answering, and a third artificial intelligence model for generating facial expressions and mouth shapes that match the content of the speech.

The first artificial intelligence model may be a model trained to extract a question text, which is a text included in the user's voice data, the second artificial intelligence model may be a model trained to grasp the context of the question included in the question text and generate an answer text which is an answer to the question, and the third artificial intelligence model may be a model trained to identify the emotion matching a word based on an attribute of word included in the answer text, and select a mouth shape image matching the answer text and a facial expression image matching the identified emotion.

Accordingly, the metahumans 10, 11, and 12 may perform two-way conversation, that is, may grasp a context regarding whether input data is the question or the answer based on the user's voice, and provide an answer therefor, and jointly provide a facial expression image and a tone of the voice appropriate to the context.

As an embodiment, the electronic device may include at least one of a server, a smartphone, a tablet personal computer (CP), a mobile phone, a video phone, a kiosk, and a laptop PC, a netbook computer, a laptop computer, a notebook computer, a personal digital assistant (PDA), a portable multimedia player (PMP), and a wearable device.

Meanwhile, the memory 110 may store various programs and data required for the operation of the electronic device 100. The memory 110 may be implemented as a non-volatile memory 110, a volatile memory 110, a flash-memory 110, a hard disk drive (HDD), or a solid state drive (SSD).

The communication unit 120 may communicate with an external device. In particular, the communication unit 120 may include various communication chips such as a Wi-Fi chip, a Bluetooth chip, a wireless communication chip, an NFC chip, and a low-energy Bluetooth chip (BLE chip). At this time, the Wi-Fi chip, the Bluetooth chip, and the NFC chip perform communication in a LAN mode, a WiFi mode, a Bluetooth mode, and an NFC mode, respectively. When using the Wi-Fi chip or Bluetooth chip, various connection information such as SSID and session key are first transmitted and received, and various information may be transmitted and received after establishing a communication connection using the connection information. The wireless communication chip refers to a chip that performs communication according to various communication standards such as IEEE, ZigBee, 3rd Generation (3G), 3rd Generation Partnership Project (3GPP), Long Term Evolution (LTE), and 5th Generation (5G).

The processor 130 can control the overall operation of the electronic device 100 using various programs stored in the memory 110. The processor 130 may be constituted by RAM, ROM, a graphics processing unit, a main CPU, first to n interfaces, and a bus. At this time, the RAM, the ROM, the graphics processing unit, the main CPU, the first to n-th interfaces, etc. may be connected to each other through the bus.

The RAM stores O/S and application programs. Specifically, when the electronic device 100 is booted, the O/S is stored in the RAM, and various application data selected by the user may be stored in the RAM.

The ROM stores a set of instructions for booting the system. When a turn-on instruction is input and power is supplied, the main CPU copies the O/S stored in the memory 110 to the RAM according to the instruction stored in the ROM, executes the O/S, and boots the system. When booting is completed, the main CPU copies various application programs stored in the memory 110 to the RAM and executes the application programs copied to the RAM to perform various operations.

The graphics processing unit uses a calculator (not shown) and a renderer (not shown) to generate a screen containing various objects such as items, images, and text. Here, the calculator may be configured to calculate attribute values such as coordinate values, shape, size, color, etc. for each object to be displayed according to a layout of the screen using a control instruction received from an inputter. Additionally, the renderer may be configured to generate screens of various layouts including objects based on the attribute values calculated by the calculator. The screen generated by the renderer may be displayed within a display area of a display.

The main CPU accesses the memory 110 and performs booting using the OS stored in the memory 110. And, the main CPU performs various operations using various programs, contents, data, etc. stored in the memory 110.

The first to n-th interfaces are connected to the various components described above. One of the first to n-th interfaces may be a network interface connected to an external device through a network.

Meanwhile, furthermore, the processor may control an artificial intelligence model. In this case, of course, the processor may include a dedicated graphics processor (e.g., GPU) for controlling the artificial intelligence model.

Meanwhile, the artificial intelligence model according to the present disclosure may be a model based on supervised learning or unsupervised learning. Furthermore, the artificial intelligence model according to the present disclosure may include a support vector machine (SVM), a decision tree, a neural network, etc., and methodologies of applying the support vector machine (SVM), the decision tree, and the neural network.

In an embodiment, the artificial intelligence model according to the present disclosure may be an artificial intelligence model based on Convolutional Deep Neural Networks (CNN) learned by inputting training data. However, the artificial intelligence model is not limited thereto, and of course, various artificial intelligence models may be applied to the present disclosure. For example, models such as Deep Neural Network (DNN), Recurrent Neural Network (RNN), Bidirectional Recurrent Deep Neural Network (BRDNN), and Random Forest (RF) may be used as the artificial intelligence models, but are not limited to these.

In this case, the Convolutional deep Neural Networks (CNN) is a type of multilayer perceptrons designed to use minimal preprocessing. The Convolutional deep Neural Networks (CNN) consist of one or several convolutional layers and general artificial neural network layers on top of the convolutional layers, and additionally utilize weights and pooling layers. Such a structure allows the Convolutional deep Neural Networks (CNN) to fully utilize input data of a two-dimensional structure. Additionally, the Convolutional deep Neural Networks (CNN) may be trained via standard back propagation. The convolutional deep Neural Networks (CNN) has an advantage of being easier to train and using fewer parameters than other feedforward artificial neural network techniques.

In addition, the Deep Neural Networks (DNN) is an artificial neural network (ANN) constituted by a plurality of hidden layers between an input layer and an output layer.

At this time, the structure of the deep neural networks (DNN) may be constituted by a perceptron. The perceptron is constituted by several input values, one processor, and one output value. The processor multiplies multiple input values by weights, respectively, and then aggregates all of the input values multiplied by the weights. Next, the processor substitutes the aggregated values into an activation function and outputs one output value. When a specific value is intended to come out as the output value of the activation function, the weight multiplied by each input value may be modified and the output value may be recalculated using the modified weight. At this time, respective perceptrons may use different activation functions. Further, the respective perceptrons receive outputs delivered in a previous layer as an input, and then, obtain an output by using the activation function. The obtained output is delivered to an input of a next layer. By going through the above-described process, several output values may be finally obtained.

A recurrent neural network (RNN) refers to a neural network in which a connection between units constituting an artificial neural network configures a directed cycle. The recurrent neural network (RNN) may utilize a memory inside a neural network in order to process any input unlike the neural network.

The Deep Belief Networks (DBN) as a generative graphical model used in machine learning refers to a deep neural network constituted by multiple layers of latent variables in deep learning. It is characterized in that there is a connection between layers, but no connection between units within the layer.

Due to a characteristic of the deep belief networks (DBN) as a generative model, the deep belief networks (DBN) may be used for prior learning, and after learning an initial weight through the prior learning, the weight may be fine-tuned through backpropagation or other discriminant algorithms. This characteristic is very useful when there is little training data, because the smaller the training data, the stronger the influence of the initial value of the weight on the resulting model. The pre-learned weight initial value becomes closer to an optimal weight compared to an arbitrarily set initial weight value, which enables improved performance and speed of a fine-tuning stage.

The RF is a type of ensemble learning method used in classification, regression analysis, etc., and operates by outputting classification or average predicted values (regression analysis) from multiple decision trees constructed during the training process, and the biggest feature of the RF is that trees have slightly different characteristics by randomness. The characteristic allows predictions of respective trees to be decorrelated, ultimately improving generalization performance. Further, randomization makes the forest robust against data containing noise. The randomization occurs during the training process of each tree, and bagging and randomized node optimization, which are ensemble learning methods using a random learning data extraction method, are often used. The two methods are used simultaneously with each other to further improve the randomization characteristic.

The contents regarding the artificial intelligence and the learning method thereof described above are for illustrative purposes, and the artificial intelligence and the learning method thereof used in the above-described embodiments are not limited. For example, all types of artificial intelligence technologies and learning methods thereof that may be applied by those skilled in the art to solve the same problem may be used to implement the system according to the disclosed embodiment.

Meanwhile, the processor 130 may include one or more cores (not shown) and a graphics processing unit (not shown) and/or a connection path (e.g., bus, etc.) for transmitting and receiving signals with other components.

The processor 130 according to an embodiment performs the method described in connection with the present disclosure by executing one or more instructions stored in the memory 110.

For example, the processor 130 may acquire new training data by executing one or more instructions stored in the memory 110, perform a test for the acquired new training data by using a trained model, extract first training data in which in which labeled information is acquired with an accuracy of a predetermined first reference value or more, delete the extracted first training data from the new training data, and train the trained model again by using the new training data from which the extracted training data is deleted.

Meanwhile, the processor 130 may further include a random access memory (RAM) (not shown) and a read-only memory (ROM) (not shown) temporarily and/or permanently storing signals (or data) processed within the processor 130. Additionally, the processor 130 may be implemented in the form of a system on chip (SoC) that includes at least one of the graphics processing unit, the RAM, and the ROM.

The memory 110 may store programs (one or more instructions) for processing and controlling the processor 130. Programs stored in the memory 110 may be divided into a plurality of modules according to functions.

Figure 2:
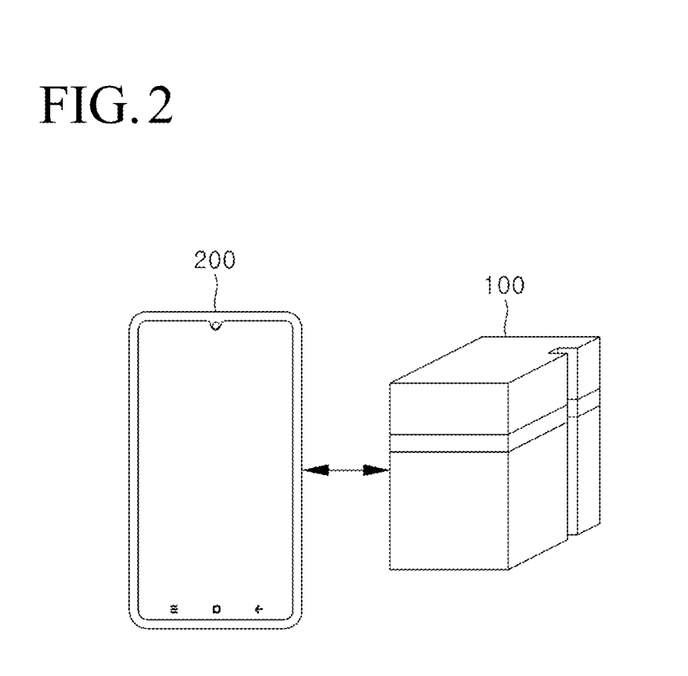
FIG. 2 is a system configuration diagram according to an embodiment of the present disclosure.

FIG. 2 is a system configuration diagram according to an embodiment of the present disclosure.

Meanwhile, when the electronic device 100 is the server, as shown in FIG. 2, the electronic device 100 may constitute a system including a server 100 providing a virtual space representing an offline marketplace and a user terminal 200 communicating with the server 100 and outputting a virtual image in the virtual space.

At this time, the server 100 may set a virtual location of a user in the virtual space based on the input of the user acquired through the user terminal 200, and provide at least one virtual image matched with the virtual location of the user to the user terminal 200 based on image data constituting the virtual space.

The virtual location may be location coordinates of the user in the virtual space, and may include a viewing angle range and a direction in which the user views the virtual space.

At this time, it is possible to provide the user terminal 200 with an image of at least one metahuman 10 positioned within a predetermined distance from the virtual location of the user in the virtual space.

Here, the user terminal 200 may be an electronic device owned by the user, or a kiosk installed in a specific place (e.g., a store installed in a store in the offline marketplace, a wall surface in the offline marketplace, a village hall, etc.).

The user terminal 200 may include a memory containing information (e.g., consumer information, seller information, etc.) for service use of the user in the virtual space, an input device acquiring a user instruction according to the input of the user, an output device outputting information such as an image, a sound, etc., a communication unit communicating with the server 100, and a processor which controls an overall operation of the user terminal 200, and connected to each of the memory, the input device, the output device, and the communication unit.

The input device may include a touch-type display, a keyboard, a mouse, a camera, a microphone, etc., and the output devices may include a display, a speaker, etc.

The display is a component for visually outputting various information.

The display may be implemented as a liquid crystal display (LCD), a plasma display panel (PDP), organic light emitting diodes (OLED), a transparent OLED (TOLED), a Micro LED, etc., but is not limited thereto and may include various types of displays known in the related art. The display may be implemented in the form of a touch screen capable of detecting a user's touch operation, or may be implemented as a flexible display that may be folded or bent.

Figure 3:
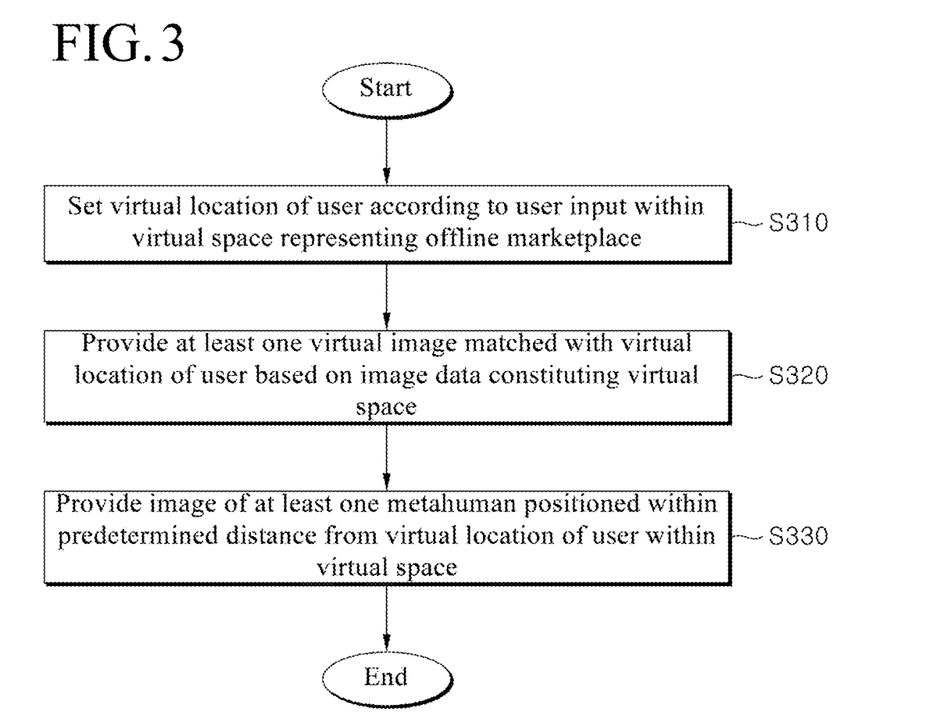
FIG. 3 is a basic flowchart according to an embodiment of the present disclosure.

FIG. 3 is a basic flowchart according to an embodiment of the present disclosure.

As shown in FIG. 3, the electronic device 100 may set a virtual location of a user according to a user input within a virtual space representing an offline marketplace (S310), provide at least one virtual image matched with the virtual location of the user based on image data constituting the virtual space S320), and provide an image of at least one metahuman 10 positioned within a predetermined distance from the virtual location of the user in the virtual space (S330).

Through this, the user may purchase products or acquire information about products without being restricted by physical strength, time, and space within the virtual space.

Figure 4:
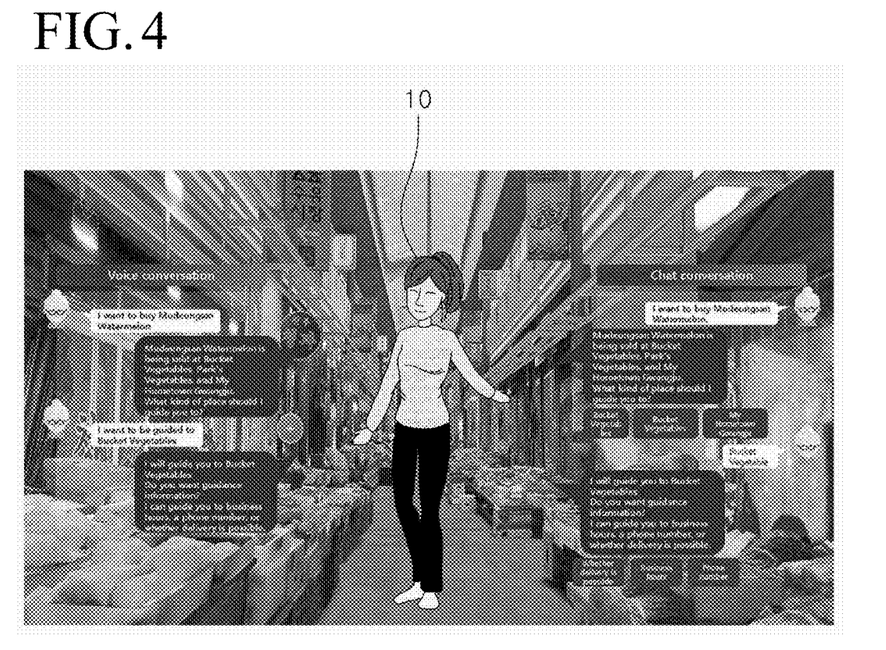
FIGS. 4 and 5 are exemplary diagrams showing a metahuman according to an embodiment of the present disclosure.
Figure 5:
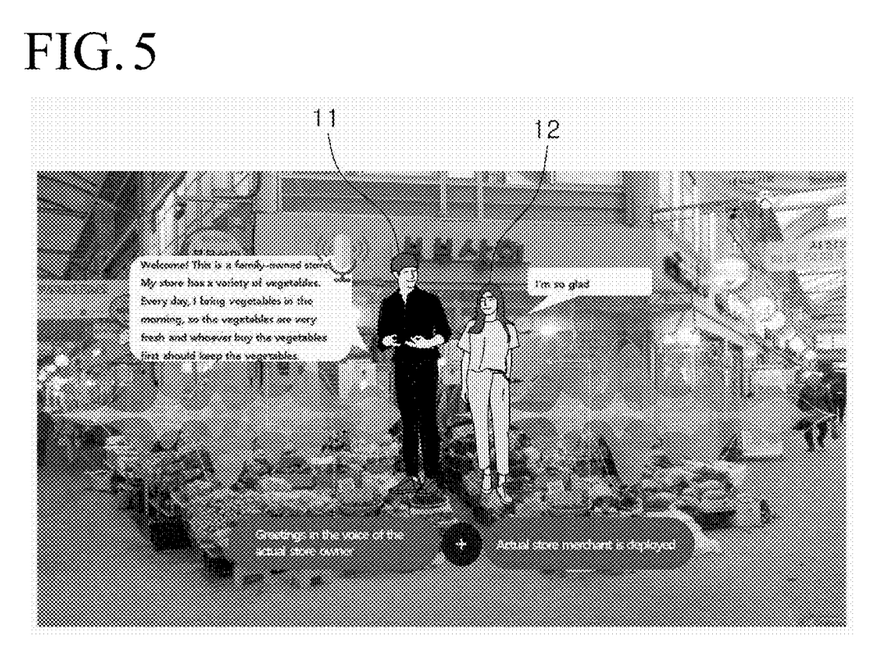

FIGS. 4 and 5 are exemplary diagrams showing metahumans 10, 11, and 12 according to an embodiment of the present disclosure.

As shown in FIG. 4, the metahuman 10 in the virtual space performs customer assistance services such as product guidance, store guidance, product purchase support, and discount guidance, and payment history guidance by performing questioning and answering through at least one of voice conversation and chat conversation.

The product guidance is a service providing a location (e.g., a location in the offline marketplace, a location in the virtual space, etc.) of seller selling a specific product (e.g., Mudeungsan Watermelon).

The store guidance is a service providing a location of a specific seller (e.g., a company name, a business owner, etc.) in the offline marketplace, the virtual space, etc.

The product purchase support is a service providing a payment screen when intending to purchase a specific product online or offline.

The discount guidance is a service providing a discount price for a specific product, a list of products on discount, etc.

The payment history guidance is a service providing information such as a price paid, a product, a discount rate, and received Metaco (virtual currency that may be consumed as a payment means in the offline marketplace) as a user purchases a product.

Meanwhile, as shown in FIG. 5, the electronic device 100 may configure the metahumans 11 and 12 based on an image and voice of a seller positioned in the offline marketplace.

Specifically, the electronic device 100 may generate images of the metahumans 11 and 12 for each of a plurality of sellers based on location information in the virtual space, a seller image, seller voice, and seller information for each of the plurality of sellers in the offline marketplace.

The seller information may include data on a seller's business registration certificate, the business name of the seller's store, the address of the seller's store, the list of products on sale according to the seller's input, the list of products handled by the seller, the list of discounted products by the seller, the prices of products on sale by the seller, whether the seller can order a parcel service, whether the seller can order delivery, whether the seller is exposed to advertisements, etc., but is not limited thereto.

In performing step S330, when a user input for selecting at least one of a plurality of sellers is acquired, the electronic device 100 may provide the images of the metahumans 11 and 12 according to the selected seller.

In the embodiment, in a store, when a plurality of metahumans 11 and 12 are generated as shown in FIG. 5, the electronic device 100 may randomly select a metahuman providing the customer assistance service among the plurality of metahumans 11 and 12, or provide the metahuman selected according to the user input.

Figure 6:
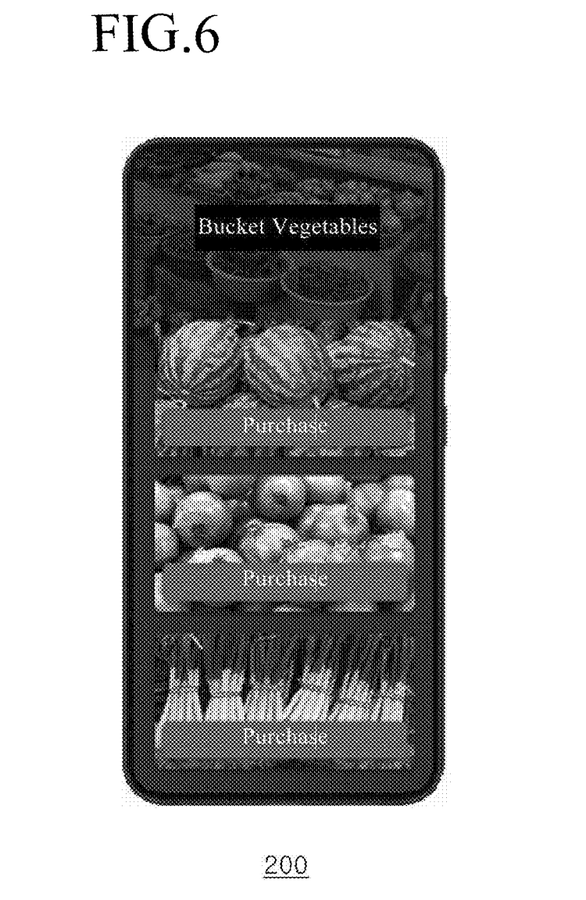
FIG. 6 is an exemplary diagram showing a purchase according to an embodiment of the present disclosure.

FIG. 6 is an exemplary diagram showing a purchase according to an embodiment of the present disclosure.

As shown in the chat conversation of FIG. 4 and FIG. 6, the electronic device 100 may provide a user interface (UI) for acquiring the user input.

Here, the electronic device 100 acquires consumer information including at least one of the user's personal information, purchase history, payment means information, and shopping cart information, based on the user's input to identify the age of the user based on the consumer information.

The personal information may include personal information such as the user's name, age, contact information, gender, and residence, the purchase history may include a payment history for a product for which the user previously paid, the payment means information may include information on a payment means such as a card used by the user for the purchase, an account number for an account transfer target, and the amount of Metacoin held, and the shopping cart information may be information about the list of products which the user selects for purchase in the virtual space.

Accordingly, in performing step S320, the electronic device 100 sets a UI configuration in the provided virtual image based on the user's age to differently provide a UI configuration considering the complexity of a UI input and accessibility to services according to age, that is, a size of a button, the number of buttons, the type of button, etc., included in the virtual image and acquiring the user's input.

Figure 7:
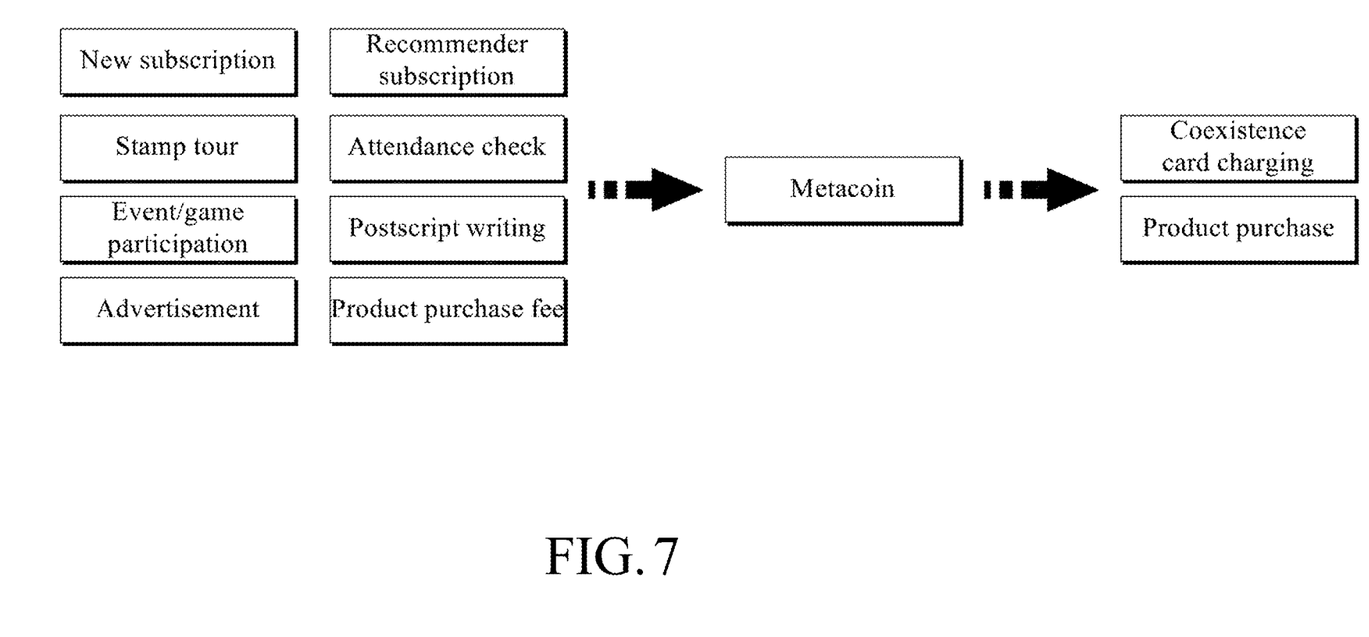
FIG. 7 is an exemplary diagram showing metacoin providing according to an embodiment of the present disclosure.

FIG. 7 is an exemplary diagram showing metacoin providing according to an embodiment of the present disclosure.

As shown in FIG. 7, the electronic device 100 may pay metacoin to the user, and the user may use the metacoin like cash in the offline marketplace or use the metacoin to recharge a card, which is a payment means.

Meanwhile, in performing step S310, the electronic device 100 calculates a location change amount of the user in the virtual space and pays metacoin calculated by applying a first value to the location change amount to the user to increase movement and an advertising viewing rating within the virtual space.

In the embodiment, when applying the first value to the location change amount, the electronic device 100 may update and apply the first value based on the purchase history of the user.

Specifically, the electronic device 100 may acquire each of a purchase price and purchase time based on a purchase history generated within a predetermined period within the virtual space of the user.

The electronic device 100 calculates a first value proportional to the purchase price, updates the calculated first value, and applies the updated first value to the location change amount, and when it is proven that a product actually purchased, increases and updates the first value based on the purchase prices to provide the user with a larger amount of metacoin than simply moving within the virtual space.

In addition, in the embodiment, the electronic device 100 may identify a purchase point within a first time at which a movement change amount is acquired, and identify a second time, which is the time at which the movement change amount after the last purchase point occurs for the first time.

Accordingly, the electronic device 100 applies the first value applied to the movement change amount acquired in the second time as a reference value that is the minimum value of the first value to provide metacoin provided in the second time after the purchase is terminated for the first time in a smaller amount than the time when movement is made for purchase.

Meanwhile, the electronic device 100 may acquire location information, which is GPS coordinates in the user's real world.

Accordingly, the electronic device 100 may calculate a movement distance of the user within the offline marketplace based on the location information, and pay metacoin calculated by applying the second value to the movement distance to the user.

At this time, the second value may be a value larger than the first value.

For example, if the user moves the same section between the virtual space and the offline marketplace, the amount of Metacoin acquired when moving within the virtual space is smaller than the amount of Metacoin acquired when actually moving within the offline marketplace.

Additionally, the electronic device 100 calculates a game score based on a performance history for game contents by providing pre-registered game contents to provide a metacoin proportional to the game score.

The game score may be calculated based on the user's performance information generated for a game, such as the performance time of the game content, the number of performance times, and an acquired score.

Meanwhile, in performing step S320, when at least one advertisement information is included in the provided virtual image, the electronic device 100 may provide first images of respective advertisement information, and when an input of the user of selecting at least one of the first images is identified, enlarge and provide the selected image at a predetermined ratio.

The advertisement information may include an advertisement image (e.g., a poster, text, a video containing a sound source, etc.) of a seller positioned in at least one of the virtual space and the offline marketplace, an advertisement image pre-registered by an advertiser who requests an advertisement, etc., and the electronic device 100 may charge metacoin to the seller and the advertiser according to advertisement cost which is in proportion to at least one of a period during which the advertisement image is launched, the number of times at which the advertisement image is exposed, and a size of the advertisement image.

In enlarging and providing the selected image at the predetermined ratio, when the selected image is an image for recipe information, the electronic device 100 may identify a seller for each of a plurality of products included in bundle discount information based on the virtual location of the user when bundle discount information matched with the recipe information is registered.

The recipe information may be information needed for cooking, such as a cooking method for one food, required products (cooking utensils, ingredients, etc.), etc.

At this time, the electronic device 100 may provide location information within the virtual space for each identified seller, and bundle discount information.

Meanwhile, the electronic device 100 may provide a metacoin proportional to the purchase price to the user as a fee for the purchase price, based on the purchase history.

In the embodiment, the electronic device 100 may generate bundle discount information based on a pre-registered product required for each recipe, discount history for each product, and a list of products sold on the same day.

Specifically, the electronic device 100 may identify a recipe that may be configured by at least one combination of products currently on sale, based on the list of products sold on the same day, and apply a discount prices based on discount histories of the products constituting the identified recipe.

The electronic device 100 may identify a seller for each product to which a discount price is applied and acquire a discount consent from each seller of the product to which the discount price is applied.

At this time, the electronic device 100 may acquire any one of consent to the discount price, consent to the adjusted discount price, and non-consent, and store the products of the seller who provides consent as bundle discount information.

In the embodiment, when identifying a seller for each of a plurality of products included in the bundle discount information, when at least two first products among the plurality of products are pre-registered as sale products for a first seller among the identified sellers, the electronic device 100 may determine whether at least one second product among the first products is pre-registered as a sale product of a second seller.

Accordingly, when it is determined that the second product is pre-registered as the sale product of the second seller, if the user's purchase history for the first product is generated, the electronic device 100 may identify each seller who trades the first product with the user, and calculate a weight corresponding to the number of sellers who trade the first product when there are a plurality of sellers who trade the identified first product.

The electronic device 100 may promote coexistence among sellers located in the offline marketplace by reflecting the weight in the amount of metacoin provided according to the purchase fee and providing increased metacoin to the user.

At this time, the increased amount of metacoin may be limited to not exceed a predetermined amount, but is not limited thereto.

In the embodiment, the electronic device 100 may select a delivery company for at least one product purchased by the user according to the user's input.

At this time, the electronic device 100 may select one delivery company whose delivery area includes any one of the user's residence identified based on the user's personal information and the delivery address according to the user's input, and provide the product purchased by the user and seller information of the product purchased by the user to the selected delivery company.

Accordingly, it is possible for the user to request delivery of the purchased product through the delivery company.

Steps of a method or algorithm described in association with the exemplary embodiments of the present disclosure can be directly implemented as hardware, or implemented as a software module executed by the hardware, or a combination thereof. The software module may be configured to include a nonvolatile memory such as a random access memory (RAM), a read only memory (ROM), an erasable programmable ROM (EPROM), an electrically erasable programmable ROM (EEPROM), a flash memory, a hard disk, a removable disk, a CD-ROM, or any type of computer-readable recording medium well-known in the art to which the present disclosure pertains.

In addition, different embodiments of the present disclosure may complement or combine with each other.

The components of the present disclosure may be implemented as a program (or application) and stored in a medium in order to be executed in conjunction with a computer, which is hardware. The components of the present disclosure may be implemented as software programming or software elements, and similarly, embodiments may include various algorithms implemented as combinations of data structures, processes, routines or other programming constructs to be implemented in a programming or scripting language such as C, C++, Java, assembler, Python, etc. Functional aspects may be implemented as algorithms executed on one or more processors.

Hereinabove, the embodiments of the present disclosure have been described with the accompanying drawings, but it can be understood by those skilled in the art that the present disclosure can be executed in other detailed forms without changing the technical spirit or requisite features of the present disclosure. Therefore, it should be understood that the above-described exemplary embodiments are illustrative in all aspects and do not limit the present disclosure.

DESCRIPTION OF REFERENCE NUMBERS

10, 11, 12: Metahumans
100: Electronic Device
110: Memory
120: Communication Unit
130: Processor
200: User Terminal

What is claimed is:

1. A control method for an electronic device, comprising:
setting, by the electronic device, a virtual location of a user according to a user input within a virtual space representing an offline marketplace;
providing, by the electronic device, at least one virtual image matched with the virtual location of the user based on image data constituting the virtual space; and
providing, by the electronic device, an image of at least one metahuman positioned within a predetermined distance from the virtual location of the user within the virtual space,
wherein the metahuman includes
providing at least one customer assistance service among questioning and answering, product guidance, store guidance, product purchase support, discount guidance, and payment history guidance according to the user input, and
the setting of the virtual location of the user further includes
calculating a location change amount of the virtual location of the user within the virtual space, and
paying, to the user, metacoin which is virtual currency consumable by a payment means within the offline marketplace, which is calculated by applying a first value corresponding to a weight to the location change amount, and
wherein the control method for an electronic device includes:
identifying, by the electronic device, at least one purchase point within a first time at which the location change amount of the virtual location of the user is acquired;
identifying, by the electronic device, a corresponding second time after a final purchase point of the user occurs within the first time; and
providing, by the electronic device, the metacoin by applying a minimum value of the first value to the second time for the first time in calculating the metacoin by applying the first value to the first time.

2. The control method for an electronic device of claim 1, wherein the metahuman includes a first artificial intelligence model for performing voice recognition, a second artificial intelligence model for performing questioning and answering, and a third artificial intelligence model for generating facial expressions and mouth shapes that match the content of the speech,
- the first artificial intelligence model is a model trained to extract a question text, which is a text included in the user's voice data,
- the second artificial intelligence model is a model trained to grasp the context of the question included in the question text and generate an answer text which is an answer to the question, and
- the third artificial intelligence model is a model trained to identify the emotion matching a word based on an attribute of word included in the answer text, and select a mouth shape image matching the answer text and a facial expression image matching the identified emotion.

3. The control method for an electronic device of claim 1, further comprising:
- generating, by the electronic device, an image of a metahuman for each of the plurality of sellers based on location information in the virtual space, a seller image, seller voice, and seller information for each of the plurality of sellers in the offline marketplace,
- wherein the providing of the image of the metahuman further includes
- providing an image of a metahuman according to the selected seller when a user input of selecting at least one of the plurality of sellers is acquired.

4. The control method for an electronic device of claim 1, further comprising:
- acquiring, by the electronic device, consumer information including personal information, a purchase history, payment means information, and shopping information of the user based on the input of the user; and
- identifying, by the electronic device, the age of the user based on the consumer information,
- wherein the providing of the virtual image further includes
- setting a user interface (UI) configuration within the provided virtual image based on the age of the user.

5. The control method for an electronic device of claim 1, further comprising:
- acquiring, by the electronic device, location information of the user;
- calculating, by the electronic device, a movement distance of the user within the offline marketplace based on the location information; and
- paying, by the electronic device, metacoin calculated by applying a second value to the movement distance to the user,
- wherein the second value is a value larger than the first value.

6. The control method for an electronic device of claim 1, further comprising:
- providing, by the electronic device, pre-registered game contents; and
- providing, by the electronic device, metacoin based on a performance history for the game contents.

7. The control method for an electronic device of claim 1, wherein the providing of the virtual image further includes
- providing, when at least one advertisement information is included in the provided virtual image, a first image of each of the advertisement information, and
- enlarging and providing, when an input of the user of selecting at least one of the first images is identified, the selected image at a predetermined ratio.

8. The control method for an electronic device of claim 7, wherein the enlarging and providing the selected image at the predetermined ratio further includes
- identifying, when the selected image is an image for recipe information, if bundle discount information matched with the recipe information is registered, a seller for each of a plurality of products included in the bundle discount information based on the virtual location of the user, and
- providing location information of each identified seller in the virtual space and the bundle discount information.

9. A system comprising:
- a server providing a virtual space representing an offline marketplace; and
- a user terminal communicating with the server, and outputting a virtual image within the virtual space,
- wherein the server
- sets a virtual location of the user within the virtual space based on an input of a user acquired through the user terminal,
- provides at least one virtual image matched with the virtual location of the user based on image data constituting the virtual space, and
- provides an image of at least one metahuman positioned within a predetermined distance from the virtual location of the user within the virtual space to the user terminal,
- wherein the metahuman
- provides at least one customer assistance service among questioning and answering, product guidance, store guidance, product purchase support, discount guidance, and payment history guidance according to the user input, and
- includes a first artificial intelligence model for performing voice recognition, a second artificial intelligence model for performing questioning and answering, and a third artificial intelligence model for generating facial expressions and mouth shapes that match the content of a speech, and
- the first artificial intelligence model is a model trained to extract a question text, which is a text included in the user's voice data,
- the second artificial intelligence model is a model trained to grasp the context of the question included in the question text and generate an answer text which is an answer to the question, and
- the third artificial intelligence model includes a model trained to identify the emotion matching a word based on an attribute of word included in the answer text, and select a mouth shape image matching the answer text and a facial expression image matching the identified emotion, and
- wherein the server
- sets the virtual location of the user, calculates a location change amount of the virtual location of the user in the virtual space, and pays, to the user, metacoin which is virtual currency consumable by a payment means within the offline marketplace, which is calculated by applying a first value corresponding to a weight of the location change amount,
- identifies at least one purchase point within a first time at which the location change amount of the virtual location of the user is acquired,
- identifies a corresponding second time after a final purchase point of the user occurs within the first time, and provides the metacoin by applying a minimum value of the first value to the second time for the first time in calculating the metacoin by applying the first value to the first time.

\* \* \* \* \*